Figure 1:
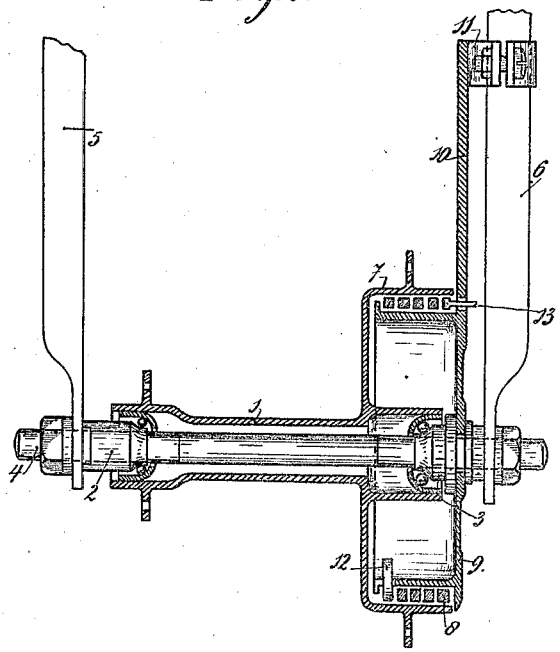

C. W. KUIJPER.
BRAKE MECHANISM FOR VEHICLES.
APPLICATION FILED NOV. 26, 1917. RENEWED DEC. 30, 1918.

1,306,766.

Patented June 17, 1919.

UNITED STATES PATENT OFFICE.

CORNELIS WILLEM KUIJPER, OF DEN HULST, A. D. DEDEMSVAART, NETHERLANDS.

BRAKE MECHANISM FOR VEHICLES.

1,306,766.

Specification of Letters Patent.

Patented June 17, 1919.

Application filed November 26, 1917, Serial No. 204,061. Renewed December 30, 1918. Serial No. 269,029.

*To all whom it may concern:*

Be it known that I, CORNELIS WILLEM KUIJPER, a subject of the Queen of the Netherlands, residing at Den Hulst, a. d. Dedemsvaart, the Netherlands, have invented certain new and useful Improvements in Brake Mechanism for Vehicles, of which the following is a specification.

In systems of operating brakes on cycles, motor cars and the like, in which the transmission means comprise rods, steel wires, Bowden wires, or the like, involving a pulling or thrusting action to bring the brake into operation, it becomes impossible to apply the brake if any part of the transmission means fails. This frequently occurs when steel wires are used, but failure is also liable to occur with rod connections, for instance, in consequence of nuts becoming loose.

This invention refers to brakes for cycles, motor cycles, motor cars, and the like, hereinafter referred to generally and in the claims as vehicles, and has for its object the production of improved brake mechanism whereby the brake is automatically applied in the event of failure in the transmission means or in case of fracture of the braking element. Thus the risk of driving with brakes which cannot be applied is avoided.

According to this invention a brake drum is provided, say, upon the hub of a wheel, and within the drum a helical spring is fitted having the tendency to expand into contact with the inside of the drum. One end of this spring is fastened to a fixed part of the vehicle. The other end is connected with an actuating device, for example, a lever, operated by the transmission means, by which the spring may be wound so as to remove it from contact with the interior of the drum or released and so permitted to expand into contact therewith. It will thus be recognized that the power required for applying the brake is contained within the mechanism itself, so that the brake will go hard on if nuts work loose or any part of the transmission means becomes fractured.

For withdrawing the brake, the transmission means may be provided with a hand lever to be operated by the driver of the vehicle, and provision is made for retaining the brake out of action when required; for instance, a spring catch or pawl may be fitted for that purpose close to the hand lever.

Vehicles having brakes according to this invention may be guarded against unauthorized use or theft by locking the transmission means when the brake is applied. For instance, means may be provided for locking the actuating device. In such cases the lock only requires to secure the part in position as the force required to apply the brake is contained within the mechanism itself.

An example of the construction and application of a brake according to this invention will now be described with reference to the accompanying drawing, in which:—

Figure 2:
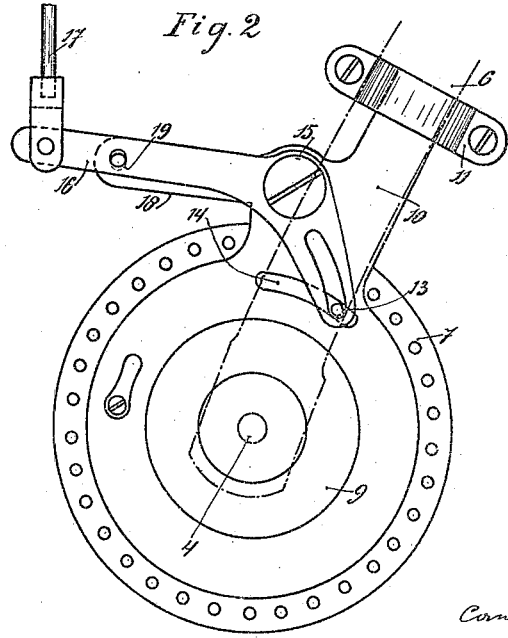

Figure 1 is a sectional elevation and Fig. 2 is a side view.

In the drawing, the brake is shown as fitted to the front hub of a bicycle, but it is equally suitable for fitting to the back wheel, and may be constructed to form a back-pedaling brake.

For motor cycles, motor cars and wagons, and the like, the construction may be made correspondingly heavier and stronger.

In the drawing, 1 designates the hub of the wheel which is mounted on an axle 4 having ball bearings 2 and 3. The axle 4 is carried by forks 5 and 6. On the hub 1 a brake drum 7 is provided which may be internally lined with copper or other material. Within the drum 7 a helical spring 8 is fitted, which, when released, will expand into contact with the inside of the drum 7. On the axle 4 a carrier 9 is mounted having an arm 10 which is secured by means of a clamp 11 to the fork 6. The carrier 9 is thus prevented from revolving. One end 12 of the helical spring 8 is fixed in an aperture formed in the body of the carrier 9, which at this part is cylindrical, and the other end 13 of the spring extends through an opening in the side of the carrier. On the arm 10 a lever 16 is mounted upon a screw pivot 15. One arm of this lever is slotted to engage with the end 13 of the spring 8. The other arm of the lever 16 is connected to a draw rod 17 forming part of the transmission means. Extending from the arm 10 is a bracket 18 having a hole at 19 adapted to receive the bolt of a lock which may be passed therethrough and through a corresponding hole in the lever 16 for securing the lever in the position it occupies when the brake is applied. As already explained, means are provided which enable the brake to be retained out of action. When the transmission means are released the spiral spring 8 will operate to draw down lever 16 and the spring will gradually expand into contact with the interior of the drum 7. The greatest braking effect will thus be exercised as soon as the lever 16 has entirely released the end 13 of the spring 8, which condition is indicated in Fig. 2.

The helical spring 8 should be formed so that the rotation of drum 7 will tend to unwind the spring.

To remove the brake, rod 17 is drawn upward with the result that spring 8 is wound up to a small extent by the action of lever 16. In this operation the carrier 9 serves to keep the spring in position and the cylindrical portion of the carrier causes the spring to remain concentric with the drum, otherwise one or more convolutions of the spring might remain in frictional contact with the interior of the brake drum 7.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined in the appended claims.

What I claim as my invention and desire to secure by Letters Patent is:

1. Brake mechanism for vehicles, consisting of a brake drum, a helical spring within the brake drum having the tendency to expand into contact with the interior of the drum, an actuating device, the spring having one end fastened to a fixed part of the vehicle, the other end connected with said actuating device by which the spring may be wound so as to be removed from contact with the interior of the drum or released and permitted to expand.

2. Brake mechanism for vehicles, consisting of a hub, a brake drum provided on the hub, a helical spring within the brake drum having the tendency to expand into contact with the interior of the drum, an actuating device, the spring having one end fastened to a fixed part of the vehicle, the other connected with said actuating device by which the spring may be wound so as to be removed from contact with the interior of the drum or released and permitted to expand, and a carrier having a cylindrical portion about which the spring is wound, for the purpose set forth.

3. Brake mechanism for vehicles, consisting of a brake drum, a brake lever, a helical spring within the brake drum having the tendency to expand into contact with the interior of the drum, the spring having one end fastened to a fixed part of the vehicle, the other end connected with said lever, for the purposes set forth.

4. Brake mechanism for vehicles, consisting of a brake drum, an actuating device, a helical spring within the brake drum having the tendency to expand into contact with the interior of the drum, the spring having one end fastened to a fixed part of the vehicle, the other end connected with said actuating device, and means for locking the actuating device in position when the brake is applied.

5. Brake mechanism for vehicles, consisting of a brake drum, a brake lever, a helical spring within the brake drum having the tendency to expand into contact with the interior of the drum, the spring having one end fastened to a fixed part of the vehicle, the other end connected with said lever, and means for locking the lever in position when the brake is applied.

6. Brake mechanism for vehicles, consisting of a brake drum, a lever forming part of transmission means, a helical spring within the brake drum having the tendency to expand into contact with the interior of the drum, a carrier having a cylindrical portion about which the spring is wound, the spring having one end fastened to said carrier, the other end of the spring being connected with said lever, and means for locking the mechanism when the brake is applied, substantially as set forth.

In testimony whereof I have affixed my signature in presence of two witnesses.

CORNELIS WILLEM KUIJPER.

Witnesses:
G. FOLLENDER,
N. J. MIMM, Jr.